United States Patent
Chen et al.

(10) Patent No.: US 10,223,016 B2
(45) Date of Patent: Mar. 5, 2019

(54) POWER MANAGEMENT FOR DISTRIBUTED STORAGE SYSTEMS

(71) Applicant: VMware, Inc., Palo Alto, CA (US)

(72) Inventors: Shi Chen, Shanghai (CN); Pin Xie, Shanghai (CN); Ting Yin, Beijing (CN)

(73) Assignee: VMWARE, INC, Palo Alto, CA (US)

( * ) Notice: Subject to any disclaimer, the term of this patent is extended or adjusted under 35 U.S.C. 154(b) by 132 days.

(21) Appl. No.: 15/150,774

(22) Filed: May 10, 2016

(65) Prior Publication Data
US 2017/0329546 A1 Nov. 16, 2017

(51) Int. Cl.
| | |
|---|---|
| *G06F 13/00* | (2006.01) |
| *G06F 3/06* | (2006.01) |
| *G06F 1/3287* | (2019.01) |
| *G06F 9/48* | (2006.01) |
| *G06F 9/455* | (2018.01) |
| *G06F 1/3206* | (2019.01) |
| *G06F 11/30* | (2006.01) |

(52) U.S. Cl.
CPC .......... *G06F 3/0625* (2013.01); *G06F 1/3206* (2013.01); *G06F 1/3287* (2013.01); *G06F 3/065* (2013.01); *G06F 3/067* (2013.01); *G06F 3/0653* (2013.01); *G06F 9/45558* (2013.01); *G06F 9/4875* (2013.01); *G06F 11/3034* (2013.01); *G06F 2009/4557* (2013.01)

(58) Field of Classification Search
CPC ............... G06F 9/5088; G06F 9/45533; G06F 11/3433; G06F 9/455
See application file for complete search history.

(56) References Cited

U.S. PATENT DOCUMENTS

| | | | |
|---|---|---|---|
| 8,589,659 B1* | 11/2013 | Shapiro | G06F 3/0641 707/827 |
| 2010/0070784 A1* | 3/2010 | Gupta | G06F 1/3203 713/310 |
| 2012/0324441 A1* | 12/2012 | Gulati | G06F 9/5088 718/1 |
| 2014/0281692 A1* | 9/2014 | Paleologu | G06F 11/2056 714/6.32 |
| 2015/0055474 A1* | 2/2015 | Eyada | H04L 67/1004 370/235 |
| 2016/0026590 A1* | 1/2016 | Park | G06F 1/206 710/316 |
| 2017/0199823 A1* | 7/2017 | Hayes | G06F 12/10 |

* cited by examiner

*Primary Examiner* — Charles Rones
*Assistant Examiner* — Han V Doan
(74) *Attorney, Agent, or Firm* — Su IP Consulting

(57) ABSTRACT

Example methods are provided to perform power management for a distributed storage system accessible by a cluster in a virtualized computing environment. The method may comprise determining that a power-off requirement is satisfied for a first host from the cluster. The power-off requirement may be satisfied based on multiple second hosts from the cluster complying with a data placement policy configured for the cluster after the first host is powered off. The method may also comprise based on the data placement policy, placing virtual machine data stored on the first host onto one or more of the multiple second hosts. The method may further comprise migrating one or more virtual machines supported by the first host to one or more of the multiple second hosts; and powering off the first host.

18 Claims, 7 Drawing Sheets

POWER MANAGEMENT FOR DISTRIBUTED STORAGE SYSTEMS

BACKGROUND

Unless otherwise indicated herein, the approaches described in this section are not admitted to be prior art by inclusion in this section.

Virtualization allows the abstraction of hardware resources and the pooling of these resources to support multiple virtual machines in a virtualized computing environment. For example, through virtualization, virtual machines running different operating systems may be supported by the same physical machine (e.g., referred to as a "host"). Each virtual machine is generally provisioned with virtual resources that provide similar functions as the physical hardware of the host, such as central processing unit (CPU) resources, memory resources, storage resources and network resources to run an operating system and applications.

Storage resources are required by a virtual machine to store data relating to the operating system and applications run by the virtual machine, etc. In a distributed storage system, storage resources of a cluster of hosts may be aggregated to form a single shared pool of storage. Virtual machines supported by the hosts within the cluster may then access the pool of storage to store data. However, for the distributed storage system to operate, all hosts within the cluster are required to be powered on at all times.

DETAILED DESCRIPTION

Figure 1:
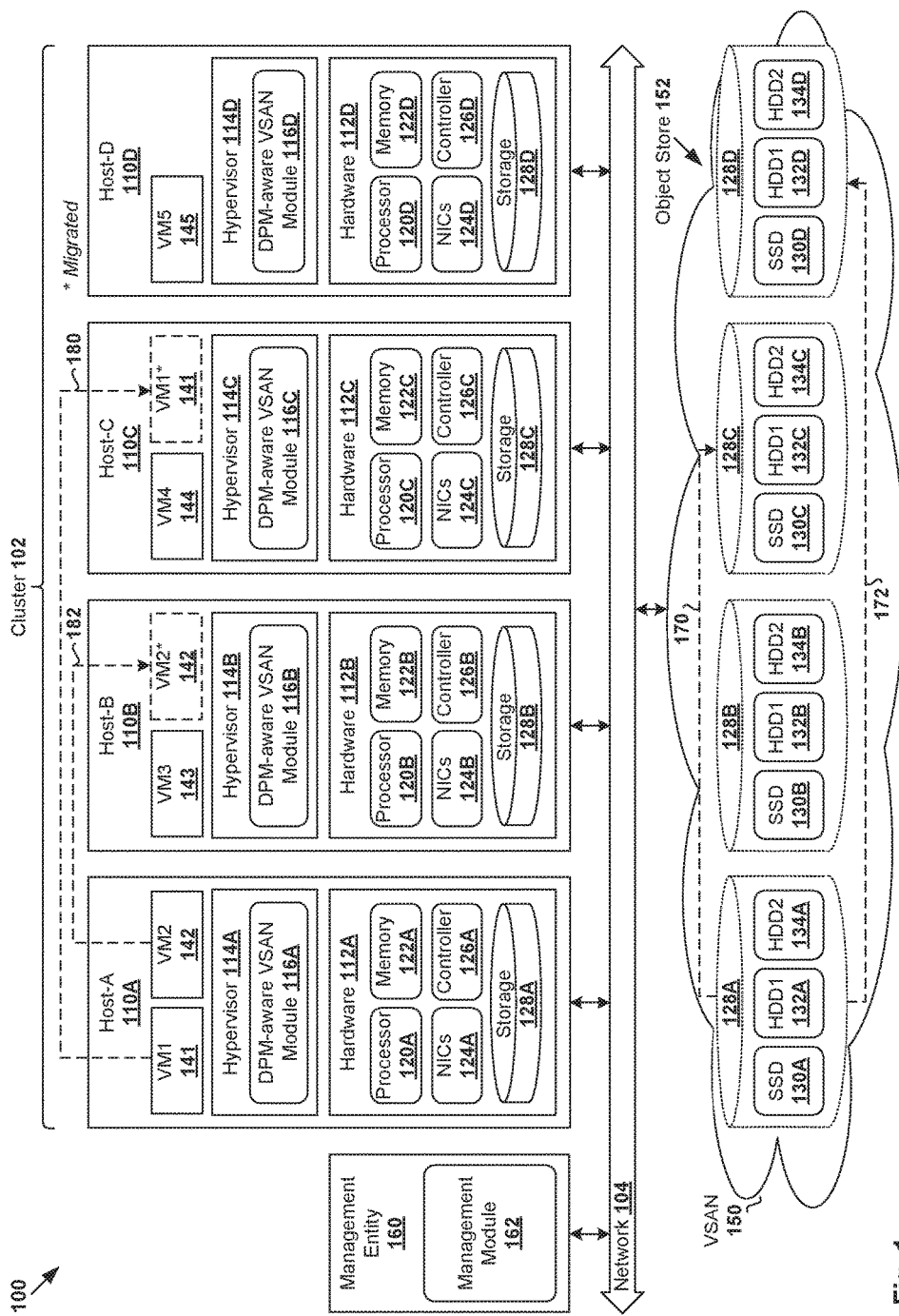
FIG. 1 is a schematic diagram illustrating an example virtualized computing environment in which power management may be performed for a distributed storage system accessible by a cluster.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

The challenges of operating a distributed storage system will now be further explained using FIG. 1, which is a schematic diagram illustrating an example virtualized computing environment 100 in which power management may be performed for distributed storage system 150 accessible by cluster 102. Although an example is shown, it should be understood that virtualized computing environment 100 may include additional or alternative components, and each component may have a different configuration.

In the example in FIG. 1, virtualized computing environment 100 includes cluster 102 of hosts (also known as "host computers", "physical servers", "server systems", "host computing systems", etc.), such as Host-A 110A, Host-B 110B, Host-C 110C and Host-D 110D. In the following, reference numerals with a suffix "A" relates to elements of Host-A 110A, suffix "B" relates to Host-B 110B, suffix "C" relates to Host-C 110C and suffix "D" relates to Host-D 110D. Although four hosts are shown for simplicity, cluster 102 may include any number of hosts.

Each host 110A/110B/110C/110D in cluster 102 includes suitable hardware 112A/112B/112C/112D and executes virtualization software such as hypervisor 114A/114B/114C/114D to maintain a mapping between physical resources and virtual resources assigned to various virtual machines. For example (see boxes shown in full lines), Host-A 110A supports VM1 141 and VM2 142; Host-B 110B supports VM3 143; Host-C 110C supports VM4 144; and Host-D 110D supports VM5 145. In practice, each host 110A/110B/110C/110D may support any number of virtual machines, with each virtual machine executing a guest operating system (OS) and applications. Hypervisor 114A/114B/114C/114D may also be a "type 2" or hosted hypervisor that runs on top of a conventional operating system on host 110A/110B/110C/110D.

Although examples of the present disclosure refer to "virtual machines," it should be understood that virtual machines running within a virtualized computing environment are merely one example of "virtualized computing instances" (also known as "workloads"). In general, a virtualized computing instance may represent an addressable data compute node or isolated user space instance. In practice, any suitable technologies aside from hardware virtualization may be used to provide isolated user space instances. For example, other virtualized computing instances may include physical hosts, client computers, containers (e.g., running on top of a host operating system without the need for a hypervisor or separate operating system such as Docker; or implemented as an operating system level virtualization), virtual private servers, etc. The virtual machines may also be complete computation environments, containing virtual equivalents of the hardware and system software components of a physical computing system.

Hardware 112A/112B/112C/112D includes any suitable components, such as processor 120A/120B/120C/120D (e.g., central processing unit (CPU)); memory 122A/122B/122C/122D (e.g., random access memory); network interface controllers (NICs) 124A/124B/124C/124D to provide network connection; storage controller 126A/126B/126C/126D that provides access to storage resources 128A/128B/128C/128D, etc. Corresponding to hardware 112A/112B/

112C/112D, virtual resources assigned to each virtual machine may include virtual CPU, virtual memory, virtual disk(s), virtual NIC(s), etc.

Storage controller 126A/126B/126C/126D may be any suitable controller, such as redundant array of independent disks (RAID) controller (e.g., RAID-0 or RAID-1 configuration), etc. Storage resource 128A/128B/128C/128D may represent one or more disk groups. As used herein, the term "disk group" may refer generally to a management construct that combines one or more physical storage devices. For example, the physical storage devices may be housed in or directly attached to host 110A/110B/110C/110D, such as hard disk drive (HDD), solid-state drive (SSD), solid-state hybrid drive (SSHD), peripheral component interconnect (PCI) based flash storage, serial advanced technology attachment (SATA) storage, serial attached small computer system interface (SAS) storage, Integrated Drive Electronics (IDE) disks, Universal Serial Bus (USB) storage, etc.

In the example in FIG. 1, host 110A/110B/110C/110D is configured with a hybrid disk group that includes a single device for caching and performance (e.g., flash device "SSD" 130A/130B/130C/130D), and multiple devices for capacity (e.g., capacity devices "HDD1" 132A/132B/132C/132D and "HDD2" 134A/134B/134C/134D). In practice, it should be understood that multiple disk groups may be configured for each host, each disk group having any suitable number of storage devices depending on the desired implementation. For example, in practice, Host-A 110A may be configured with two disk groups, and Host-B 110B with five disk groups, etc.

Hosts 110A-110D in cluster 102 aggregate their storage resources to form distributed storage system 150 representing a shared pool of storage resources 128A-128D. Distributed storage system 150 may employ any suitable technology, such as Virtual Storage Area Network (VSAN) from VMware, Inc. For example, Host-A 110A, Host-B 110B, Host-C 110C and Host-D 110D may aggregate respective local storage resources 128A, 128B, 128C and 128D into object store 152 (also known as a datastore or a collection of datastores). In this case, data stored on object store 152 may be placed on one or more of storage resources 128A-128D. Any suitable disk format may be used, such as virtual machine file system leaf level (VMFS-L), Virtual SAN on-disk file system, etc. Through network 104, virtual machine data placed on object store 152 may be accessed from one or more of storage resources 128A, 128B, 128C, 128D.

Object store 152 represents a logical aggregated volume to store any suitable virtual machine data relating to virtual machines 141-145. For example, each virtual machine 141/142/143/144/145 may be made up of a set of "objects" and the "virtual machine data" may include virtual machine disk (VMDK) objects, snapshot objects, swap objects, home namespace objects, etc. Each object may further include a set of "components."

Conventionally, all hosts 110A-110D within cluster 102 are required to be up and running all the time to maintain access to data stored on distributed storage system 150. For example, if Host-A 110A is powered off, data stored on storage resource 128A (e.g., disk group that includes "SSD" 130A, "HDD1" 132A and "HDD2" 134A) will no longer be accessible. In practice, a feature called Distributed Power Management (DPM) is generally used to power off hosts in periods of low resource utilization, and power on the hosts again when required. However, DPM cannot be used on an existing VSAN-enabled cluster 102. The problem of high power consumption is exacerbated as the size of cluster 102 increases.

Power Management

According to examples of the present disclosure, power management may be implemented to reduce power consumption in virtualized computing environment 100. In particular, instead of keeping all hosts 110A-110D fully powered on all the time, a particular host (e.g., Host-A 110A) may be selected for powering off while complying with a data placement policy configured for cluster 102. This way, workloads may be dynamically consolidated during periods of low resource utilization to make distributed storage system 150 more efficient and less expensive to run.

Figure 2:
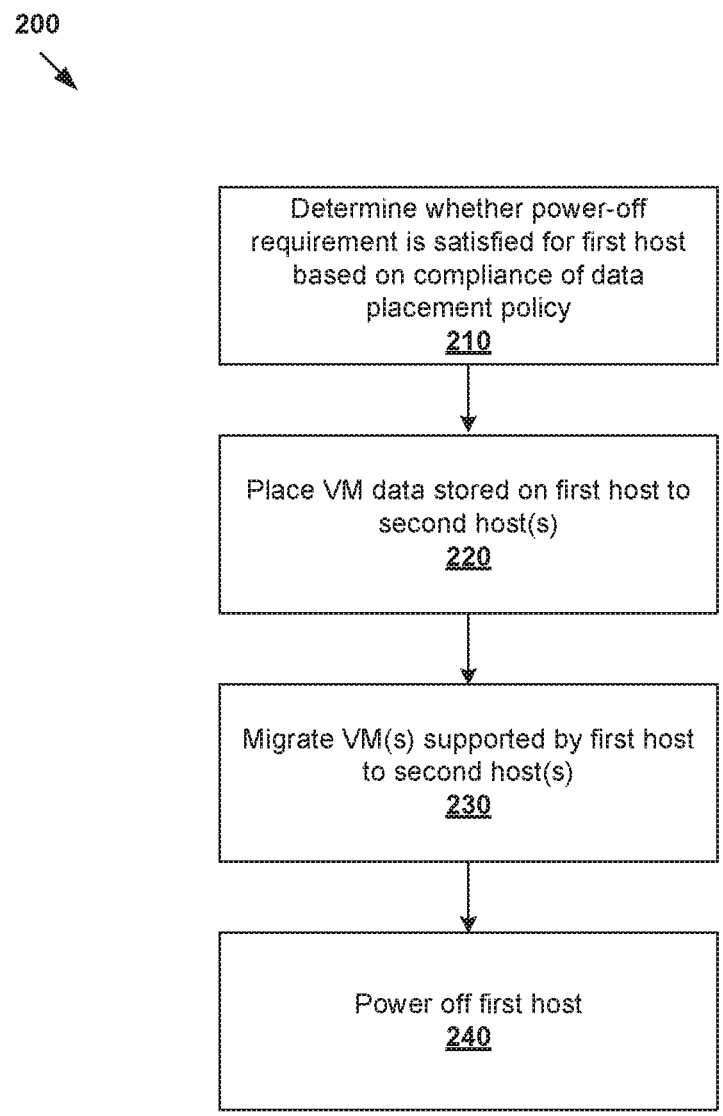
FIG. 2 is a flowchart of an example process to perform power management for a distributed storage system accessible by a cluster in a virtualized computing environment.

In more detail, FIG. 2 is a flowchart of example process 200 to perform power management for distributed storage system 150 accessible by cluster 102 in virtualized computing environment 100. Example process 200 may include one or more operations, functions, or actions illustrated by one or more blocks, such as blocks 210 to 240. The various blocks may be combined into fewer blocks, divided into additional blocks, and/or eliminated based upon the desired implementation. In the following, Host-A 110A will be used as an example "first host" to be powered off; Host-B 110B, Host-C 110C and Host-D 110D as example "second hosts" to which data is placed and virtual machines are migrated. The terms "first," "second," "third," etc., are merely used for ease of discussion to distinguish one element from another, and are not used to denote a particular order.

At 210 in FIG. 2, it is determined that a power-off requirement of Host-A 110A is satisfied. In particular, the power-off requirement may be satisfied based on the remaining Host-B 110B, Host-C 110C and Host-D 110D complying with a data placement policy configured for cluster 102.

As used herein, the term "data placement policy" (also known as a storage policy, VSAN policy, etc.) may refer generally to one or more parameters or requirements configured for virtual machines 141-145 in cluster 102. As will be described further using FIG. 3 to FIG. 6, compliance with the data placement policy may be based on one or more of the following: number of failures to tolerate (FTT), stripe width (SW), etc. The data placement policy may be configured (e.g., by a system administrator) for the whole of cluster 102 or individual virtual machines 141-145.

Further, the determination at 210 may be based on any other suitable criteria that will be discussed using FIG. 3 to FIG. 6. For example, the determination at 210 may be performed in response to determination that data rebalancing is required for cluster 102. In another example, a resource utilization level of Host-A 110A may be monitored to determine whether the level is lower than a predetermined threshold. Further, storage capacity of Host-B 110B, Host-C 110C and Host-D 110D may be examined to ensure that there is sufficient capacity to store virtual machine data currently stored on Host-A 110A.

At 220 in FIG. 2, based on the data placement policy, virtual machine data currently stored on Host-A 110A is placed onto one or more of the remaining Host-B 110B, Host-C 110C and Host-D 110D. For example, at 170 in FIG. 1, virtual machine data stored on storage resource 128A (e.g., "HDD1" 132A and/or "HDD2" 134A) is placed onto storage resource 128C (e.g., "HDD1" 132C and/or "HDD2" 134C) of Host-D 110D. At 172 in FIG. 1, virtual machine data is placed onto storage resource 128D (e.g., "HDD1" 132D and/or "HDD2" 134D) of Host-D 110D.

As used herein, the term "placing" at 220 may involve any suitable approach to store the virtual machine data onto a target storage resource. One approach is to move the virtual machine data from storage resource 128A to storage resource 128C/128D. Another approach is to copy the virtual machine data from another source (e.g., storage resource 128B that stores a copy of the virtual machine data), etc. The "virtual machine data" may be associated with a virtual machine supported by Host-A 110A (e.g., VM1 141), or a virtual machine not supported by Host-A 110A (e.g., VM3 143).

At 230 in FIG. 2, virtual machines supported by Host-A 110A are migrated to one or more of the remaining Host-B 110B, Host-C 110C and Host-D 110D. For example, VM1 141 is migrated to Host-C 110C (see 180 in FIG. 1) while VM2 142 is migrated to Host-B 110B (see 182 in FIG. 1).

At 240 in FIG. 2, Host-A 110A is powered off. Since Host-A 110A or any other host within cluster 102 does not have to be fully powered on at all time, example process 200 may be used to reduce costs associated with power consumption and hardware maintenance of cluster 102. Examples of the present disclosure may be performed by any suitable entity or entities in virtualized computing environment 100. Two examples are discussed below.

In a first approach, management entity 160 may be used to implement power management in a centralized manner. In practice, management entity 160 (e.g., vCenter, a trademark of VMware, Inc.) is deployed to provide management functionalities to manage hosts 110A-110D, virtual machines 141-135, cluster 102, distributed storage system 150, etc. Management entity 160 may be configured to perform power management for cluster 102 using any suitable module (e.g., management module 162 that implements a DPM feature). In this case, in response to the determination at block 210, management entity 160 may perform block 220 by instructing Host-A 110A to move the virtual machine data, or instructing Host-C 110C or Host-D 110D to copy the virtual machine data. Further, management entity 160 may instruct Host-A 110A to migrate VM1 141 and VM2 142 to respective Host-C 110C and Host-B 110B at block 230, and Host-A 110A to power off at block 240.

In a second approach, a master and slave approach may be used. In this case, example process 200 may be implemented or triggered by "master host" elected from cluster 102. For example in FIG. 1, Host-C 110C may be elected as the master host, in which case Host-A 110A, Host-B 110B and Host-D 110D will act as slave hosts. In this case, the master host (e.g., "DPM-aware VSAN module" 116A/116B/116C/116D) may perform block 210 by interacting with management entity 160 for a host recommendation to be powered off (e.g., querying management module 162). The master host may perform block 220 by instructing Host-A 110A to move the virtual machine data, or instructing Host-C 110C or Host-D 110D to copy the virtual machine data. Further, Host-A 110A may be instructed to migrate VM1 141 and VM2 142 to respective Host-C 110C and Host-B 110B at block 230, and power off at block 240. In practice, it should be understood that a master host (e.g., Host-A 110A) may be selected for powering off. In this case, one of the slave hosts will be promoted as the master host after an election process.

In the following, various examples will be discussed using FIG. 3, FIG. 4, FIG. 5 and FIG. 6. It should be understood that examples of the present disclosure may be implemented by management entity 160 or a master host as discussed above, or any additional and/or alternative entity or entities.

Detailed Process

Figure 3:
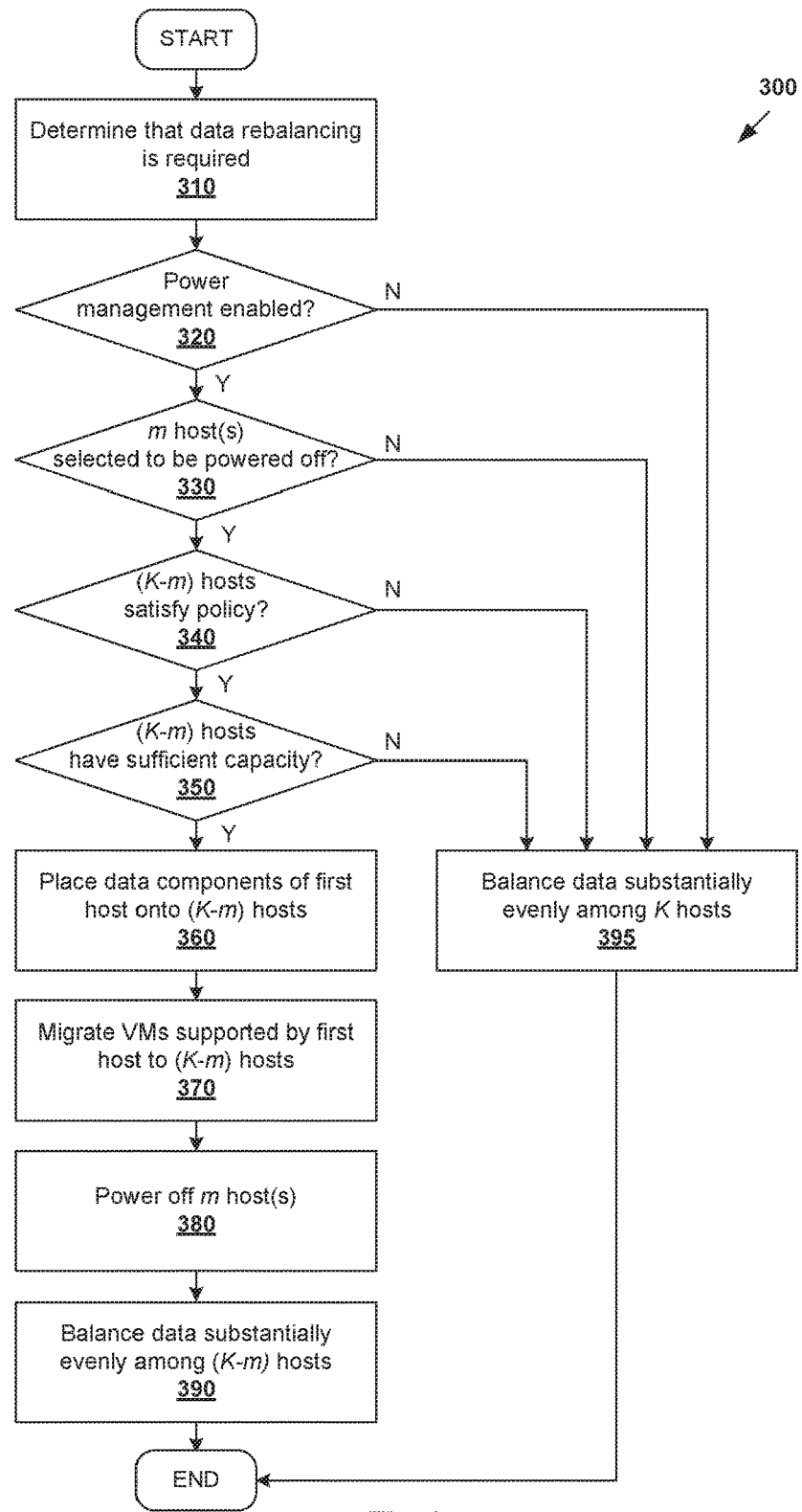
FIG. 3 is a flowchart of an example detailed process to perform power management for a distributed storage system accessible by a cluster in a virtualized computing environment.

FIG. 3 is a flowchart of example detailed process 300 to perform power management for distributed storage system 150 accessible by cluster 102 in virtualized computing environment 100. Example detailed process 300 may include one or more operations, functions, or actions illustrated by one or more blocks, such as blocks 310 to 395. The various blocks may be reordered, combined into fewer blocks, divided into additional blocks, and/or eliminated based upon the desired implementation.

Blocks 310 to 350 in FIG. 3 are related to block 210 in FIG. 2. At 310 in FIG. 3, it is determined that data rebalancing is required for cluster 102. The term "data rebalancing" may refer generally to a procedure that distribute data components substantially evenly among storage resources 128A-128D of respective hosts 110A-110D. In practice, data rebalancing is a VSAN feature that is performed to maintain consistent performance and availability in cluster 102.

Conventionally, once data rebalancing is initiated, data components are simply rebalanced among all hosts 110A-110D evenly. According to example process 300, the initiation of data rebalancing at 310 may be used to trigger power management for cluster 102 to determine whether any of hosts 110A-110D may be powered off. In this case, DPM may be used together with the rebalancing feature of VSAN. Data rebalancing may be initiated by any suitable operation, such as when any capacity device (e.g., 132A/134A/132B/134B/132C/134C/132D/134D) has reached a certain utilization level (e.g., 80%), a hardware failure is detected, host(s) placed in maintenance mode, etc. In practice, data rebalancing may also be triggered manually by a network administrator.

At 320 in FIG. 3, it is determined whether power management is enabled for cluster 102. Power management (e.g., DPM) may be enabled via an interface (e.g., graphical, command line, etc.) provided by management entity 160. If enabled, power consumption may be reduced in cluster 102 by dynamically adjusting capacity in cluster 102 according to resource demands.

At 330 in FIG. 3, in response to determination that power management is enabled, m host(s) is selected for powering off. The selection may be performed based on whether a resource utilization level of a host is lower than a predetermined threshold. The "resource utilization level" may be defined as any suitable combination (e.g., weighted value) of a CPU utilization level, memory utilization level, storage utilization level, etc. For example in FIG. 1, m=1 and Host-A 110A is selected for powering off based on its low resource utilization level.

In practice, the selection at 330 in FIG. 3 may be performed by management module 162 (e.g., DPM module) of management entity 160. Besides considering the resource utilization level, powering off is generally not recommended if it reduces the capacity of cluster 102 to below a specified minimum (e.g., minimum CPU, memory or storage capacity), or fails a cost-benefit analysis that considers the cost of migration, loss of performance, power consumed during powering down and powering on, etc.

At 340 in FIG. 3, in response to the selection of m host(s) for powering off, it is determined whether to proceed with the powering off based on the ability of the remaining K-m hosts to comply with a data placement policy associated with cluster 102. For example in FIG. 1, cluster size K=4 and there are K-m=3 remaining hosts if Host-A 110A is powered off. In this case, it is determined whether Host-B 110B, Host-C 110C and Host-D 110D are able to meet the relevant policy parameters, such as FTT, stripe width, component size, etc.

At 350 in FIG. 3, in response to the selection of m host(s) for powering off, it is determined whether to proceed with the powering off based on whether the remaining K-m hosts to satisfy a storage capacity requirement. For example in FIG. 1, the determination may include whether capacity devices of Host-B 110B, Host-C 110C and Host-D 110D have sufficient storage capacity to store data components on Host-A 110A. More detailed examples of 340 and 350 will be described using FIG. 4, FIG. 5 and FIG. 6 below.

At 360 in FIG. 3, in response to affirmative determination at 340 and 350, virtual machine data stored on the selected m host(s) is placed onto the remaining K-m hosts. For example in FIG. 1, data components may be moved from storage resource 128A to storage resource 128C (see 170), and to storage resource 128D (see 172).

In practice, a greedy algorithm may be used for data component placement. For example, data components on the selected m host(s) may be sorted according to their size and the remaining K-m hosts sorted according to their available storage capacity. For each data component to be moved, one of the remaining K-m hosts that has the highest remaining capacity and complies with the associated data placement policy may be selected. The data component is then moved, and the available storage capacity of the remaining K-m hosts updated. The greedy algorithm may be repeated until all components are moved.

At 370 in FIG. 3, virtual machines supported by the selected m host(s) are migrated to the remaining K-m hosts. For example in FIG. 1, VM1 141 is migrated from Host-A 110A to Host-C 110C (see 180), and VM2 142 to Host-B 110B. Virtual machine migration may be performed using any suitable approach, such as Vmotion (a trademark of VMware, Inc.) that enables live migration of running virtual machines with zero downtime, continuous service availability, etc.

At 380 in FIG. 3, the selected m host(s) is powered off. For example in FIG. 1, Host-A 110A may be powered off to reduce power consumption of cluster 102 when resource utilization is low. Host-A 110A may be powered on again in response to increase of resource utilization, such as when workload demand increases.

At 390 in FIG. 3, data rebalancing is performed for the remaining K-m hosts. In the example in FIG. 1, since Host-A 110A is powered off, data components may be redistributed substantially evenly across all storage resources 128B-128D of respective Host-B 110B, Host-C 110C and Host-D 110D. Through rebalancing, data components may be redistributed around cluster 102 such that all capacity devices remain below the threshold.

Otherwise, at 395 in FIG. 3, since no host is powered off, a conventional rebalancing procedure is performed for all hosts. As shown in FIG. 3, block 395 is performed in response to one of the following: power management is not enabled (see 320); no host is selected for powering off (see 330); the remaining hosts are unable to comply with the data placement policy (see 340); and the remaining hosts are unable to satisfy the storage requirement (see 350). In this case, data components will be redistributed substantially evenly across all storage resources 128A-128D.

First Example (FTT=1)

Figure 4:
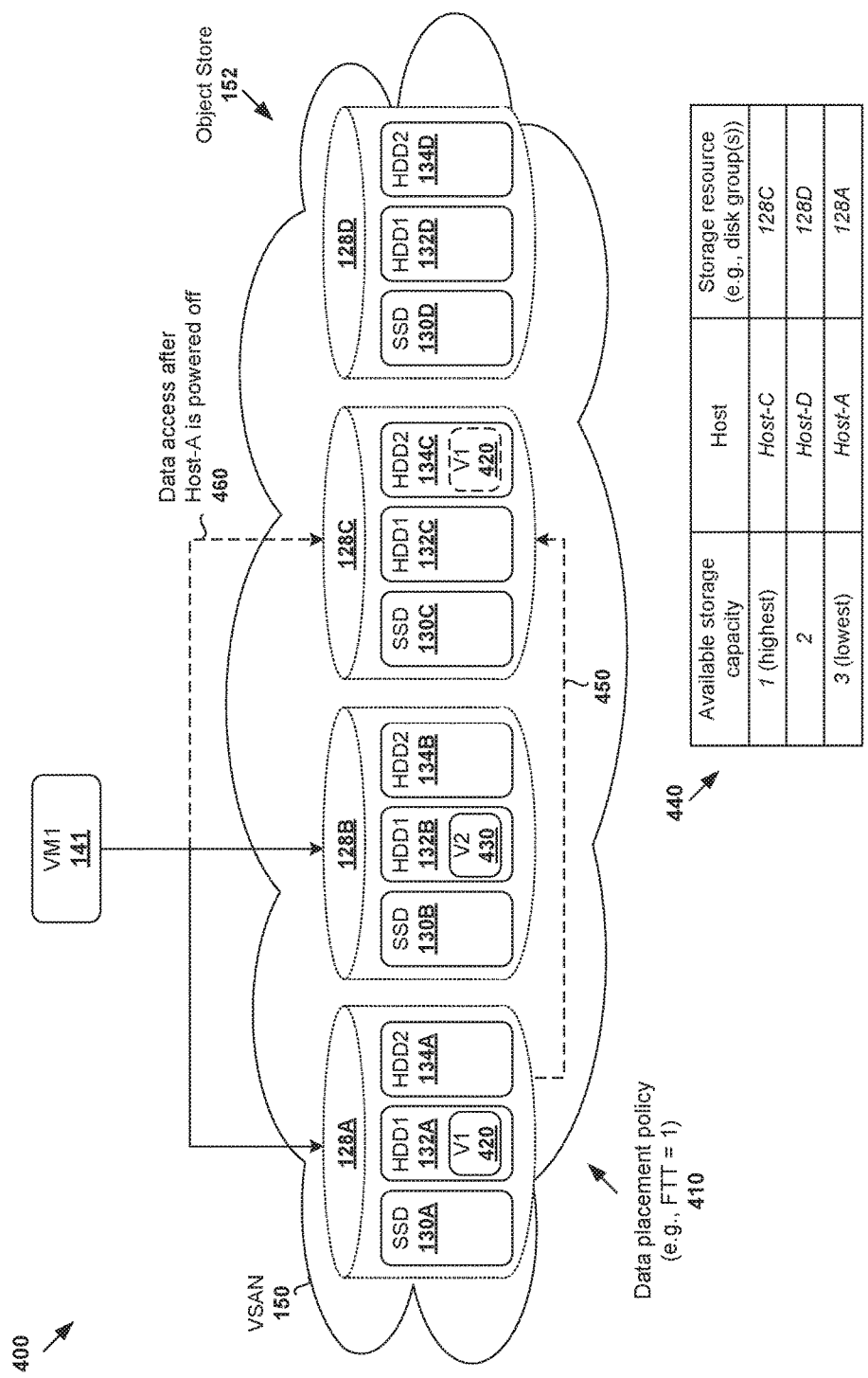
FIG. 4 is a schematic diagram illustrating a first example of data placement in a virtualized computing environment according to the example process in FIG. 3.

FIG. 4 is a schematic diagram illustrating first example 400 of data placement in virtualized computing environment 100 according to example process 300 in FIG. 3. Similar to the example in FIG. 1, storage resources 128A-128D of respective hosts 110A-110D form distributed storage system 150. For simplicity, some features in FIG. 1 are not illustrated and it should be understood that there may be additional or alternative components than that shown in FIG. 4.

In the example in FIG. 4, data placement policy 410 considered at 340 in FIG. 3 may specify FTT=N, which represents the number of failures tolerated (N≥1). To support FTT=N, a total of 2N+1 hosts are required to place N+1 copies of the virtual machine data and N witness disk or disks. The aim is to improve the resiliency of distributed storage system 150 towards a failure, such as storage disk failure, network failure, host failure, power failure, etc.

To tolerate FTT=1, each object of VM1 141 will include two (i.e., N+1=2) replica components that are placed on different hosts, such as first copy of virtual machine disk "V1" (see 420) on Host-A 110A and second copy "V2" (see 430) on Host-B 110B. In practice, this configuration may also be referred to as a RAID-1 configuration. One witness disk (i.e., N=1; not shown for simplicity) is also created on a different host to act as a tiebreaker whenever decisions have to be made to meet the FTT. Each witness disk generally contains metadata requiring less storage space than each replica component.

In response to the selection of Host-A 110A for powering off, it is determined whether the remaining Host-B 110B, Host-C 110C and Host-D 110D are able to comply with data placement policy 410 and have sufficient capacity to store "V1" 420. In this case, Host-B 110B, Host-C 110C and Host-D 110D may be sorted according to their available storage capacity (see 440 in FIG. 4) and Host-C 110C with the highest remaining capacity is selected.

At 450 in FIG. 4, first copy "V1" 420 is moved from "HDD1" 132A of Host-A 110A to "HDD2" 134C of Host-C 110C. "HDD2" 134C may be selected arbitrarily or based on its available capacity compared to "HDD1" 132C. At 460 in FIG. 4, after Host-A 110A is powered off, first copy "V1" 420 may be accessed from Host-C 110C, and second copy "V2" 430 from Host-B 110B.

Second Example (FTT=1 and FD=3)

Figure 5:
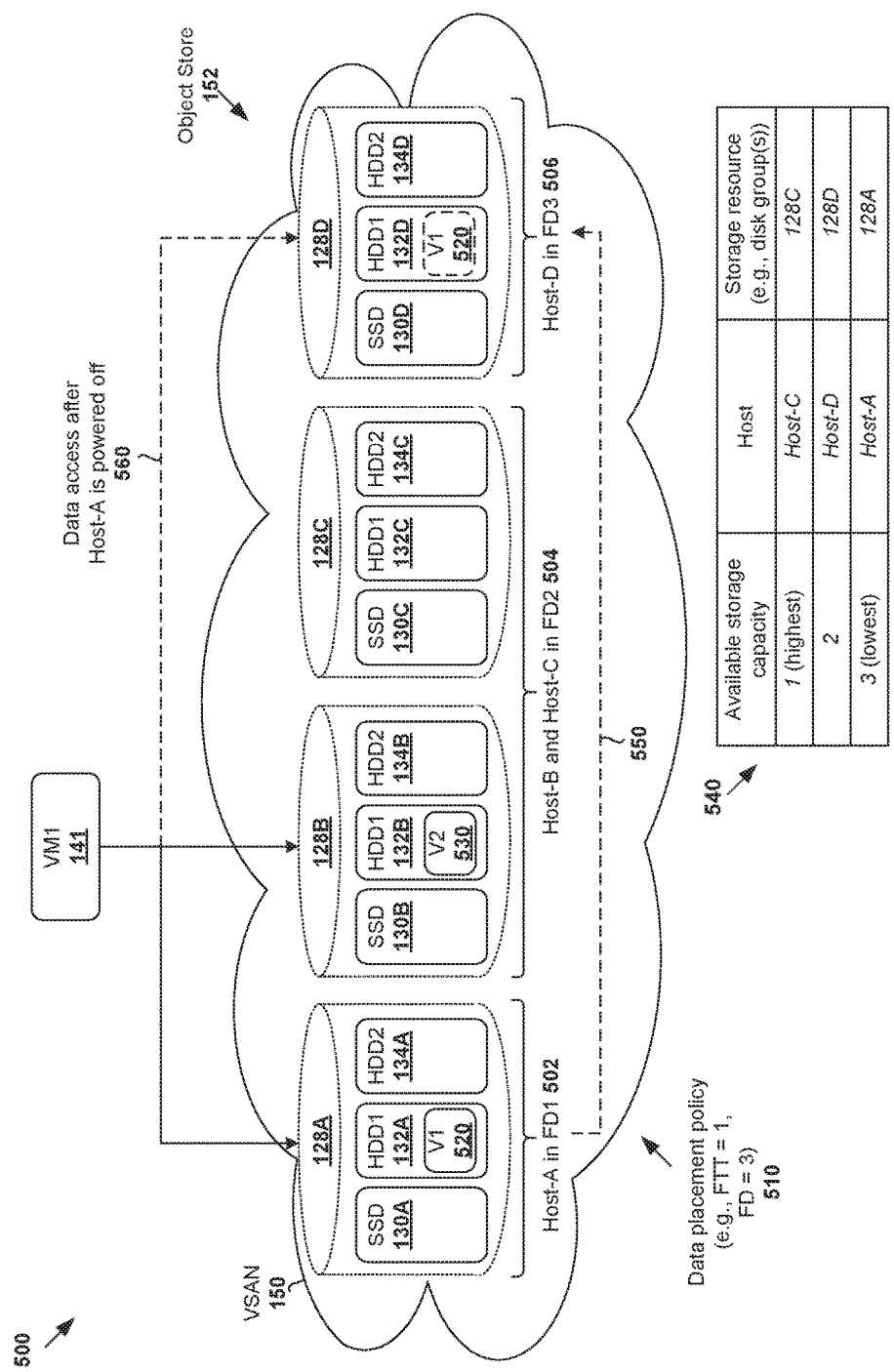
FIG. 5 is a schematic diagram illustrating a second example of data placement in a virtualized computing environment according to the example process in FIG. 3.

FIG. 5 is a schematic diagram illustrating second example 500 of data placement in virtualized computing environment 100 according to example process 300 in FIG. 3. For simplicity, some features in FIG. 1 are not illustrated in FIG. 5 and it should be understood that there may be additional or alternative components than that shown.

In the example in FIG. 5, three fault domains (i.e., FD=3) are configured in cluster 102, such as "FD1" 502, "FD2" 504 and "FD3" 506. Here, the term "fault domain" may refer generally to logical boundary or zone within which a failure may affect one or more hosts. For example, Host-B 110B and Host-C 110C are within the same fault domain (i.e., "FD2" 504) because they are likely to suffer from the same failure, such as power failure, software failure, hardware failure, network failure, any combination thereof, etc. Each fault domain may include any suitable number of hosts.

To tolerate FTT=N=1 (see 510), each object of VM1 141 will include two (i.e., N+1=2) replica components on different fault domains, such as first copy of virtual machine disk "V1" (see 520) on Host-A 110A in "FD1" 502, and second copy "V2" (see 530) on Host-B 110B in "FD2" 502. In response to the selection of Host-A 110A for powering off, it is determined whether the remaining hosts 110B-110D are able to comply with data placement policy 510 with FTT=1 and have sufficient capacity to store "V1" 420. Similar to FIG. 4, Host-B 110B, Host-C 110C and Host-D 110D may be sorted according to their available storage capacity (see 540 in FIG. 4) and Host-C 110C with the highest remaining capacity is selected.

However, since Host-C 110C is in "FD2" 504, placing "V1" 420 on Host-C 110C would not comply with the FTT=1 requirement because "V2" 430 on Host-B 110B is already in that same fault domain. In this case, another host is selected, such as Host-D 110D with the second highest available capacity. At 550 in FIG. 5, first copy "V1" 420 is moved from "HDD1" 132A of Host-A 110A to "HDD1" 132D of Host-D 110D. "HDD1" 132D may be selected arbitrarily or based on its available capacity compared to "HDD2" 134D. At 560 in FIG. 5, after Host-A 110A is powered off, first copy "V1" 420 may be accessed from Host-D 110D, and second copy "V2" 430 from Host-B 110B.

In practice, a fault domain may be a datacenter, pod, rack and chassis, etc. For example, a chassis may refer to an enclosure in which one or more hosts are mounted (e.g., depending on the vendor's specification). A rack (e.g., server rack) may include one or more chassis stacked to make efficient use of space and position within a pod. A pod may be a modular unit of datacenter with a set of resources or infrastructure to service one or more racks. A datacenter may be a collection of hosts housed in one or more pods, racks and chassis. Compared to the example in FIG. 4, the copies are placed on different fault domains, instead of merely different hosts. Any suitable number of fault domains may be configured.

Third Example (FTT=1, SW=2 and FD=3)

Figure 6:
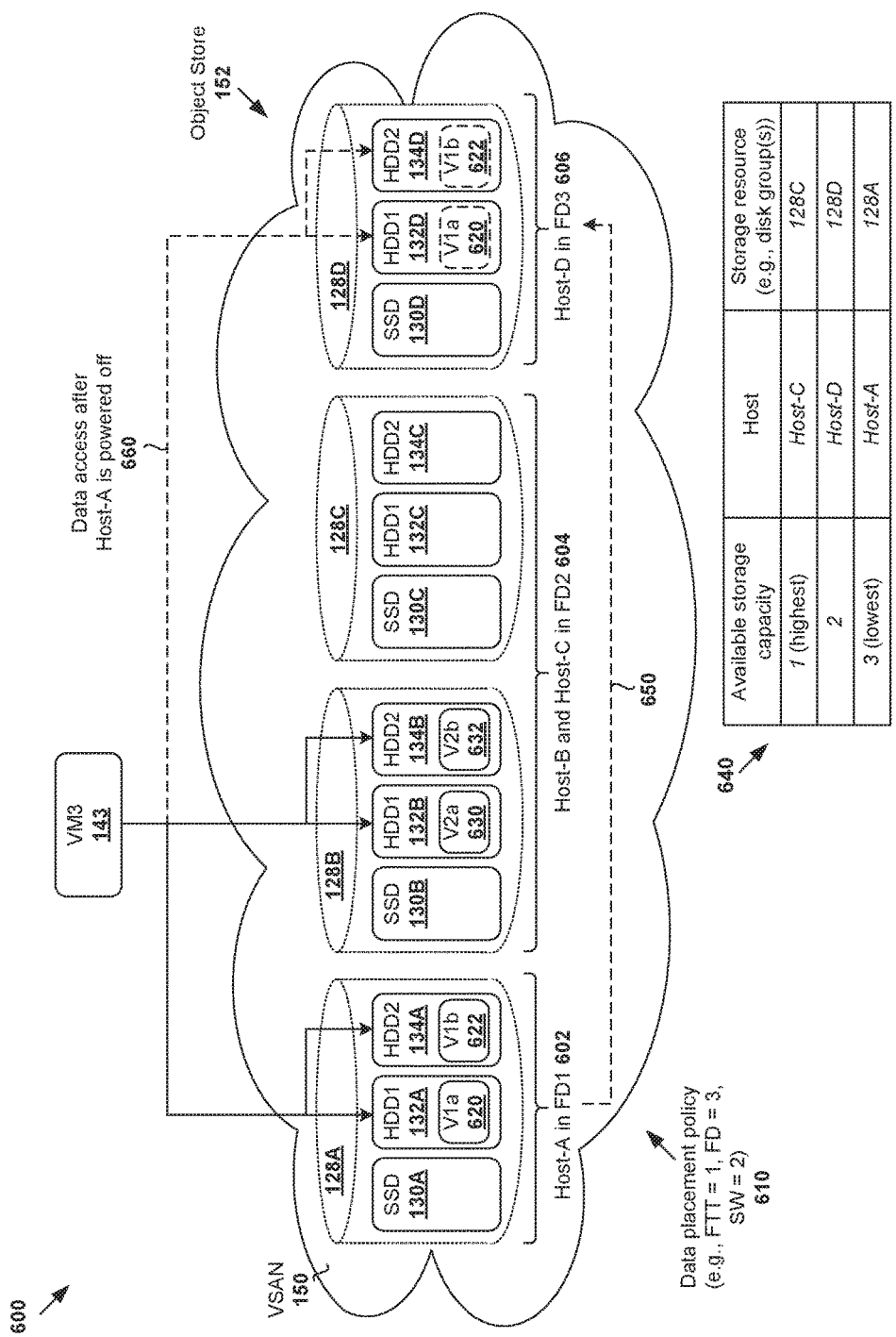
FIG. 6 is a schematic diagram illustrating a third example of data placement in a virtualized computing environment according to the example process in FIG. 3.

FIG. 6 is a schematic diagram illustrating third example 600 of data placement in virtualized computing environment 100 according to example process 300 in FIG. 3. For simplicity, some features in FIG. 1 are not shown in FIG. 6 and it should be understood that there may be additional or alternative components than that shown.

In the example in FIG. 6, data placement policy 610 specifies a stripe width (SW) that represents the minimum number of disk stripes per virtual machine object. In general, FTT is configured for availability (e.g., how data is made available when a host or disk group fails) and SW for performance (e.g., how to improve read and write performance). With striping, virtual machine data is spread across more disks that all contribute to the overall storage performance by that virtual machine. When FTT, SW and fault domains are configured, data of a single virtual machine may be stored on multiple disks on multiple fault domains.

To support FTT=N=1 and SW=2 configured for VM3 143, each object has two (i.e., N+1=2) replica components and each replica component is "striped" across two (i.e., SW=2) physical disks. For example, "V1a" 620 on "HDD1" 132A and "V1b" 622 on "HDD2" 134A represent stripes of a first copy of virtual machine disk of VM3 143. Similarly, "V2a" 630 on "HDD1" 132B and "V2b" 632 on "HDD2" 134B represent stripes of a second copy of virtual machine disk of VM3 143. Each stripe is said to be a component of the object. This way, the configuration implements both FTT (RAID-1 for mirroring) and SW (RAID-0 for striping) requirements. Although data is striped across multiple disks within the same host in FIG. 6, it should be understood that striping may occur across different hosts or fault domains.

In response to the selection of Host-A 110A for powering off, it is determined whether the remaining hosts 110B-110D are able to comply with data placement policy 610 and have sufficient capacity to store "V1a" 620 and "V1b" 622. Similar to the example in FIG. 5, Host-B 110B, Host-C 110C and Host-D 110D may be sorted according to their available storage capacity (see 640 in FIG. 4) and Host-C 110C with the highest remaining capacity is selected.

However, since Host-C 110C is in "FD2" 604, placing ""V1a" 620 and "V1b" 622 on Host-C 110C would not comply with the FTT=1 requirement because "V2a" 630 and "V2b" 632 are also in the same fault domain. Similar to the example in FIG. 5, Host-D 110D with the second highest available capacity is selected. At 650 in FIG. 6, "V1a" 620 and "V1b" 622 are moved from Host-A 110A to Host-D 110D. At 660 in FIG. 6, after Host-A 110A is powered off, "V1a" 620 and "V1b" 622 are accessible from respective "HDD1" 132D and "HDD2" 134D of Host-D 110D.

Although some examples are shown, it should be understood that data placement policy 410/510/610 may specify any other suitable parameters, such as flash read cache reservation (e.g., amount of read flash capacity reserved for a storage object as a percentage of the logical size of the object), object space reservation (i.e., percentage of the logical size of a storage object that should be reserved when a virtual machine is being provisioned), maximum object or component size, etc. In practice, data placement policy 410/510/610 may be configured for all virtual machines 141-145 within cluster 102 by default, or individually for a particular virtual machine (e.g., VM1 141 in FIG. 4 and FIG. 5, and VM3 143 in FIG. 6).

Further, although virtual machines 141-145 are illustrated as examples, fault-tolerant pairs may be deployed. For example, a primary (P) virtual machine and a secondary (S) virtual machine may be deployed for each virtual machine. From a user's perspective, each pair appears as a single, logical virtual machine. The user interacts with the logical virtual machine via the primary virtual machine (e.g., VM-1P), while the secondary virtual machine (e.g., VM-1S) is configured as a backup for the primary virtual machine in the event of a failure.

In order for the primary virtual machine to fail over to the secondary virtual machine without the loss of availability or data, the secondary virtual machine needs to have the same state information as the primary virtual machine had at the time of the failure. For example, this may involve the primary virtual machine sending state information to the secondary virtual machine to replicate the primary virtual machine. In this case, virtual machine migration at 230 in FIGS. 2 and 370 in FIG. 3 may take into account of the location of the primary or secondary virtual machine such that they are not on the same host or fault domain.

Computing System

Figure 7:
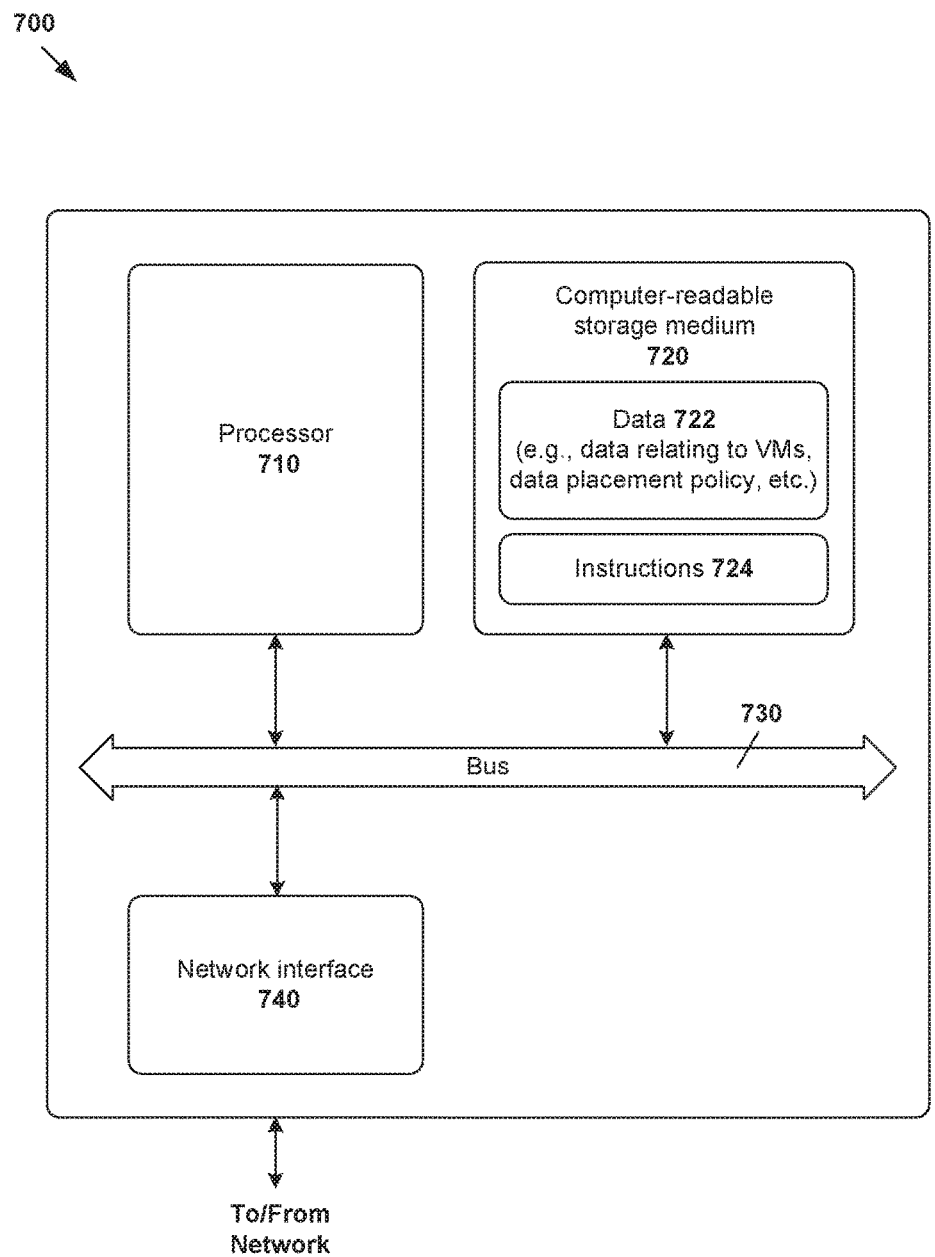
FIG. 7 is a schematic diagram illustrating an example computing system.

The above examples can be implemented by hardware (including hardware logic circuitry), software or firmware or a combination thereof. FIG. 7 is a schematic diagram illustrating example computing system 700 acting as management entity 160 or host 110A/110B/110C/110D. Example computing system 700 may include processor 710, computer-readable storage medium 720, network interface 740, and bus 730 that facilitates communication among these illustrated components and other components.

Processor 710 is to perform processes described herein with reference to the drawings. Computer-readable storage medium 720 may store any suitable data 722, such as data relating to virtual machines, data components, data placement policy, etc. Computer-readable storage medium 720 may further store computer-readable instructions 724 ("program code") that, in response to execution by processor 710, cause processor 710 to perform processes described herein with reference to FIG. 1 to FIG. 6.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), programmable switch architectures, and others. The term 'processor' is to be interpreted broadly to include a processing unit, ASIC, logic unit, or programmable gate array, etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PFD1), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, where the elements or procedure shown in the drawings are not necessarily essential for implementing the present disclosure. Those skilled in the art will understand that elements in the examples can be arranged in the device in the examples as described, or can be alternatively located in one or more devices different from that in the examples. The elements in the examples described can be combined into one module or further divided into a plurality of sub-elements.

We claim:

1. A method for a computing system in a virtualized computing environment to perform power management for a distributed storage system accessible by a cluster in the virtualized computing environment, the method comprising:
    determining, by the computing system, that a power-off requirement is satisfied for a first host from the cluster, wherein the power-off requirement is determined to be satisfied based on multiple second hosts from the cluster complying with a data placement policy configured for the cluster after the first host is powered off, and wherein the data placement policy specifies one or more of the following: a number of failure to tolerate, a stripe width corresponding to a number of disk stripes per virtual machine object, and a fault domain associated with each of the multiple second hosts;
    based on the data placement policy, selecting, by the computing system, one or more of the multiple second hosts and placing virtual machine data stored on the first host onto the one or more of the multiple second hosts;
    instructing, by the computing system, to migrate one or more virtual machines supported by the first host to the one or more of the multiple second hosts; and
    instructing, by the computing system, to power off the first host.

2. The method of claim 1, wherein the determining that the power-off requirement is satisfied for the first host comprises:
    prior to determining that the power-off requirement is satisfied for the first host, determining that data rebalancing is required for in the cluster.

3. The method of claim 2, wherein the method further comprises:
    after powering off the first host, performing data rebalancing to distribute data components substantially evenly among storage devices associated with the multiple second hosts.

4. The method of claim 1, wherein the determining that the power-off requirement is satisfied for the first host comprises:
    determining that a resource utilization level associated with the first host is lower than a predetermined threshold.

5. The method of claim 1, wherein the determining that the power-off requirement is satisfied for the first host comprises:
    determining that one of more of the multiple second hosts have sufficient storage capacity for the virtual machine data.

6. The method of claim 1, wherein the selecting the one or more of the multiple second hosts is based on an amount of storage capacity available on each of the multiple second hosts.

7. A non-transitory computer-readable storage medium comprising instructions, which when executed in a computing system in a virtualized computing environment, cause the computing system to perform a method to perform power management for a distributed storage system accessible by a cluster in the virtualized computing environment, the method comprising:
    determining, by the computing system, that a power-off requirement is satisfied for a first host from the cluster, wherein the power-off requirement is determined to be satisfied based on multiple second hosts from the cluster complying with a data placement policy configured for the cluster after the first host is powered off, and wherein the data placement policy specifies one or more of the following: a number of failure to tolerate, a stripe width corresponding to a number of disk stripes per virtual machine object, and a fault domain associated with each of the multiple second hosts;
    based on the data placement policy, selecting, by the computing system, one or more of the multiple second hosts and placing virtual machine data stored on the first host onto the one or more of the multiple second hosts;

instructing, by the computing system, to migrate one or more virtual machines supported by the first host to the one or more of the multiple second hosts; and instructing, by the computing system, to power off the first host.

8. The non-transitory computer-readable storage medium of claim 7, wherein the determining that the power-off requirement is satisfied for the first host comprises:

prior to determining that the power-off requirement is satisfied for the first host, determining that data rebalancing is required for in the cluster.

9. The non-transitory computer-readable storage medium of claim 8, wherein the method further comprises:

after powering off the first host, performing data rebalancing to distribute data components substantially evenly among storage devices associated with the multiple second hosts.

10. The non-transitory computer-readable storage medium of claim 7, wherein the determining that the power-off requirement is satisfied for the first host comprises:

determining that a resource utilization level associated with the first host is lower than a predetermined threshold.

11. The non-transitory computer-readable storage medium of claim 7, wherein the determining that the power-off requirement is satisfied for the first host comprises:

determining that one of more of the multiple second hosts have sufficient storage capacity for the virtual machine data.

12. The non-transitory computer-readable storage medium of claim 7, wherein the selecting the one or more of the multiple second hosts is based on an amount of storage capacity available on each of the multiple second hosts.

13. A computing system in a virtualized computing environment configured to perform power management for a distributed storage system accessible by a cluster in the virtualized computing environment, comprising:

a processor; and a non-transitory computer-readable medium having stored thereon program code that, upon being executed by the processor, cause the processor to:

determine that a power-off requirement is satisfied for a first host from the cluster, wherein the power-off requirement is determined to be satisfied based on multiple second hosts from the cluster complying with a data placement policy configured for the cluster after the first host is powered off, and wherein the data placement policy specifies one or more of the following: a number of failure to tolerate, a stripe width corresponding to a number of disk stripes per virtual machine object, and a fault domain associated with each of the multiple second hosts;

based on the data placement policy, select one or more of the multiple second hosts and place virtual machine data stored on the first host onto the one or more of the multiple second hosts;

instruct to migrate one or more virtual machines supported by the first host to the one or more of the multiple second hosts; and instruct to power off the first host.

14. The computing system of claim 13, wherein program code for determining that the power-off requirement is satisfied for the first host cause the processor to:

prior to determining that the power-off requirement is satisfied for the first host, determine that data rebalancing is required for in the cluster.

15. The computing system of claim 14, wherein the program code further cause the processor to:

after powering off the first host, perform data rebalancing to distribute data components substantially evenly among storage devices associated with the multiple second hosts.

16. The computing system of claim 13, wherein program code for determining that the power-off requirement is satisfied for the first host cause the processor to:

determine that a resource utilization level associated with the first host is lower than a predetermined threshold.

17. The computing system of claim 13, wherein program code for determining that the power-off requirement is satisfied for the first host cause the processor to:

determine that one of more of the multiple second hosts have sufficient storage capacity for the virtual machine data.

18. The computing system of claim 13, wherein program code for selecting the one or more of the multiple second hosts is based on an amount of storage capacity available on each of the multiple second hosts.

* * * * *